OXYGEN ABSORPTION
OF URETHANE FOAM
CONTAINING VARIOUS
ANTIOXIDANTS

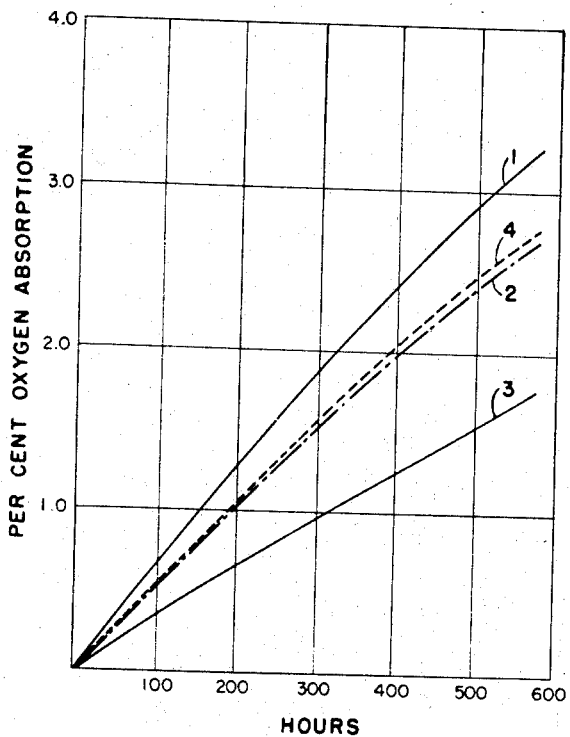

1. CONTROL -- NO ANTIOXIDANT ADDED
2. TRI OCTYL PHENYL PHOSPHITE 0.5/100 RESIN
3. ANTIOXIDANT A – 0.5/100 RESIN
4. DI-TERTIARY BUTYL PARA CRESOL – 0.5/100 RESIN

FIG. 1

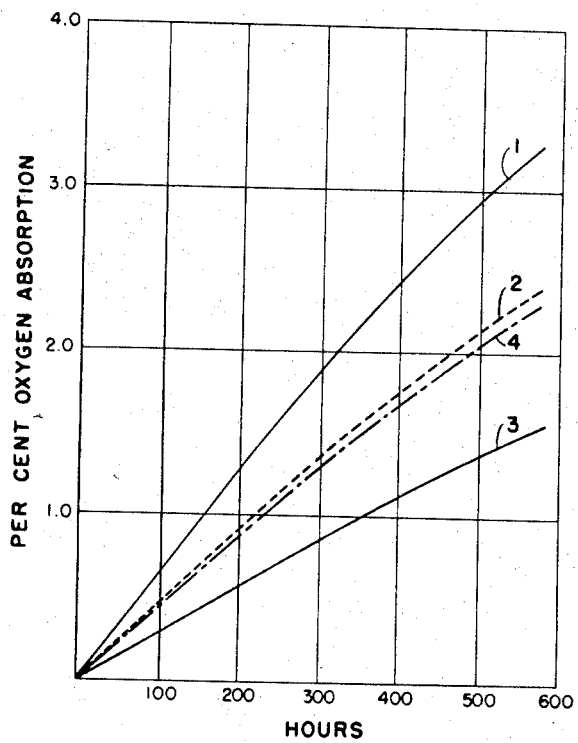

OXYGEN ABSORPTION
OF URETHANE FOAM
CONTAINING VARIOUS
ANTIOXIDANTS

1. CONTROL -- NO ANTIOXIDANT ADDED
2. TRI OCTYL PHENYL PHOSPHITE 1.0/100 RESIN
3. ANTIOXIDANT A – 1.0/100 RESIN
4. DI-TERTIARY BUTYL PARA CRESOL – 1.0/100 RESIN

FIG. 2

INVENTOR.
THOMAS H. ROGERS, JR.
BY NEWELL R. BENDER

J.B. Holden
ATTORNEY

United States Patent Office 3,401,145
Patented Sept. 10, 1968

3,401,145
STABILIZED POLYURETHANE COMPOSITIONS
Thomas H. Rogers, Jr., Akron, and Newell R. Bender, Cuyahoga Falls, Ohio, assignors to The Goodyear Tire & Rubber Company, Akron, Ohio, a corporation of Ohio
Filed Sept. 25, 1961, Ser. No. 140,590
1 Claim. (Cl. 260—45.95)

This invention relates to polyurethane compositions and more particularly to polyether-polyurethane compositions which are resistant to aging and weathering.

Deterioration of the polyether portion of the polyurethane molecule is particularly severe when the polyether portion contains alkyl side chains as in propylene oxide units. Attempts to stabilize polyurethane compositions to heat and light by addition of antioxidants normally used for rubber have been unsuccessful. The fact that the polyether-urethanes have not been stabilized against normal aging in dry atmospheres by the antioxidants generally considered most effective has led many to believe that something other than oxidative attack has caused their marked deterioration.

It is one object of the present invention to provide a polyurethane composition which is resistant to aging, weathering, and humidity, and a method of making the same.

It is another object of the present invention to provide reaction products of a polyisocyanate and a polyether glycol for use as coatings, foams, and elastomers which have improved age and weather resistant properties.

In accordance with the present invention, we have discovered that, while those antioxidants which have been most effective in rubbery polymers generally do not stabilize polyether-urethanes, antioxidants which have no active hydrogen atoms available for reaction with the polyisocyanates do provide polyether-urethane compositions, such as coatings, foams, elastomers, and the like, with greatly superior age and weather resistant properties. Apparently the degradation is caused by oxygen or ozone as initially suspected, but the difficulty with most antioxidants has heretofore been reaction between the isocyanate and the effective groups of the antioxidant.

The antioxidants of the present invention are the aralkyl phenols having the following formula:

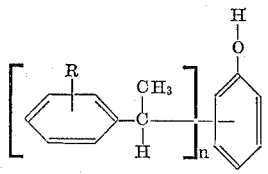

wherein R is selected from the group consisting of hydrogen and an alkyl having from 1 to 9 carbon atoms, viz, methyl, ethyl, propyl, butyl, pentyl, hexyl, octyl and nonyl, and n is selected from the numbers consisting of 1, 2, 3, 4 and 5, and where at least one of the aralkyl radicals of the structure

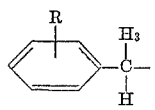

is positioned on the phenolic radical ortho to the hydroxyl group. The aralkyl radicals of this formula are those derived by replacing the appropriate hydrogen from ethyl benzene, ethyl toluene, ethyl xylene, etc. These radicals may be also known as alpha methyl benzyl; alpha methyl, p-methyl benzyl; and alpha methyl, dimethyl benzyl.

An antioxidant which gives excellent results with the polyetherurethanes is obtained by reacting for about 1 to 3 hours, one mol of phenol with about 1 to 2 mols of styrene in the presence of sulfuric acid as a catalyst. This reaction product contains a mixture of several styrenated phenols which may be separated to obtain the following compounds (for convenience of reference these compounds are designated by number):

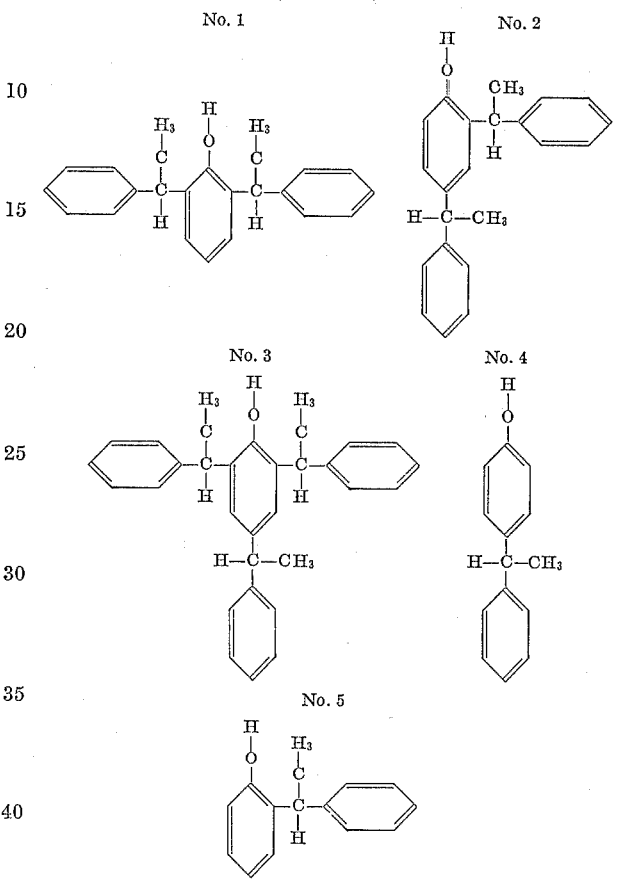

Compounds No. 1, 2, 3 and 5 may be separated from the reaction mixture by some suitable method such as chromatographic absorption and elutriation and used individually as antioxidant. But for economic as well as utility reasons, it is preferred to use the reaction product, viz, a mixture of about 10 to 30 mol percent of Compounds No. 4 and 5, 30 to 70 mol percent of Compounds No. 1 and 2, and 20 to 60 mol percent of Compound No. 3.

It should be appreciated that although Compound No. 4 is found in the above mixture, it is not included per se as an antioxidant of this invention. But it should be understood that the presence of No. 4 in this amount in the mixture does not produce the detrimental effects taught in Example 9 of U.S. Patent No. 2,915,496.

Even extremely small amounts such as 0.1% by weight or 0.2% of one of the aralkylphenols of the general formula listed herein has a noticeable effect on improving aging properties of the foamed polyether-urethanes. When the amount of the antioxidant is increased to about 0.4%, superior results are obtained. However, we generally prefer to incorporate about 0.5 to 3% of antioxidant based on the weight of polyether polyol. Larger amounts, say up to 4 or 5% may be used where the properties desired justify using an additional amount of antioxidant.

The organic antioxidant compounds are especially beneficial for polyalkylene ether glycol-urethanes, and in particular when the polyether contains alkyl side chains which are particularly vulnerable to degradation by humidity, aging and weathering. Thus, the greatest improvement is obtained with polyalkylene ether glycol urethanes containing alkylene oxide units, such as propylene, butylene, isobutylene, isopropylene, and etheylene glycols and polyglycols or polyols formed of mixtures of these. However, good age resistance is also obtained in the case of alkylene ether glycol-polyether urethanes from other polyalkylene ether glycols such as polytetramethylene ether glycol, polyneopentylene ether glycol, and polypentamethylene ether glycol and other bifunctional polyglycols of the general formula HO—(RO)$_n$—H where $n$ is an integer of 1 to 100 and R is an alkylene group such as isopropylene, ethylene, propylene, butylene, isobutylene, pentylene and the like or mixtures of these.

Representative examples of the polyether polyols which are being used commercially to produce improved polyether urethane foams and satisfactory for use in this invention are the ones prepared by the condensation of propylene oxide on glycerol and hexanetriol. Hence these polyether polyols have three reactive hydroxyls instead of two as is the case with the polyether glycols.

The reaction of an isocyanate group with an active hydrogen of a polyether forms a polymer with recurring linking units of the following general structure:

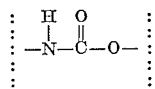

The long chain urethane polymer of the present invention has recurring units of the general formula:

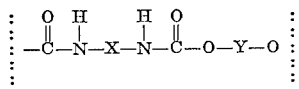

where X is a nucleus of a suitable organic diisocyanate as hereinafter described and —O—Y—O— is the residue of a polyether glycol from reaction with an organic diisocyanate.

The polyethers used to prepare cellular polyurethane products preferably have a molecular weight above 700 but those with a molecular weight as low as 500 to 600, or as high as 3500 or even somewhat higher, may be used, depending on the type of foamed material desired. The amount and rate of crosslinking determines the type of foamed material and the greater the amount of crosslinking, the more rigid the foamed material, and thus many types of improved cellular polyurethanes may be prepared according to the present invention. Both the amount and rate of crosslinking may be controlled by the use of cross linked polyethers and/or the use of crosslinking agents such as triisocyanates which have three isocyanate groups to promote crosslinking between the linear polyether molecular chains. Thus the diisocyanates used in this invention may be substituted in part with triisocyanates, particularly when rigid foams are desired. Other suitable crosslinking agents are polyhydroxy compounds such as trimethylol propane and aliphatic or aromatic glycols.

In the method of making the cellular materials, the foaming may be produced by rapid stirring preferably in a commercial foam machine by reaction of an isocyanate with water or a carboxyl group to produce $CO_2$ upon decomposition of the excess diisocyanate. The foamed material may also be produced in a foam machine by gasifying a polyether-isocyanate at high pressure or by distributing $CO_2$ or a "Freon" gas, etc., therein during the reaction stage.

In the ordinary method of making cellular polyurethane or foamed polyether diisocyanate reaction products, a viscous, liquid polyether is pumped at a controlled rate through a nozzle. Polyisocyanate, preferably a diisocyanate having two and only two isocyanate groups, is pumped, to the nozzle, where it contacts the stream of polyether and is thoroughly mixed therewith because of its high velocity or by means of a stirrer. A small amount of water is also introduced into the nozzle either as a stream or in admixture with the polyether. A suitable catalyst, such as certain tertiary amines, is also preferably mixed with the polyether or introduced into the nozzle. A stirrer is also generally present in the nozzle to insure homogeneous mixing. From the nozzle, the material is incorporated into a suitable mold, such as an open pan, which is moved in a continuous manner relative to the nozzle to provide the desired layer of viscous reactants on the bottom of the pan or mold or by use of an inclined moving belt.

Polymerization starts as the materials are mixed and the semifluid mass is discharged onto the belt. The material mixing is very important. It is essential that the diisocyanate and catalyst be almost immediately and completely dispersed in the polyether. The rate of polymerization is relatively fast and the mass is shaped by the contour of the pans. Carbon dioxide is evolved in the gaseous state from the time of mixing, discharging and shaping stages.

The foamed materials of the present invention may be formed also by first reacting a polyether with a substantial excess of a diisocyanate over a 1:1 molar ratio in the absence of any water so as to form a dry partially reacted "prepolymer" so that there are free isocyanate groups present. The "prepolymer" is generally a viscous and flowable liquid, but if it is a waxy solid at room temperature, it can be made flowable by heating to 100 to 150° F. The antioxidants of the present invention may be incorporated with the polyalkylene ether glycol and polyisocyanate during the preparation of the prepolymer. Subsequently, the "prepolymer" is reacted with water, a polyurethane reaction catalyst such as a tertiary amine and preferably a crosslinking agent containing a plurality of labile hydrogens. There is a minimum of agitation employed after the initial dispersion of water in the "prepolymer" to prevent loss of $CO_2$. The amount of water used is generally 1 to 3 parts by weight based on 100 parts of prepolymer to provide carbon dioxide for a low density product, although as low as 0.5 part by weight can be used to obtain benefits of this invention. When more than 5 parts of water are used, the urea linkages formed apparently cause a decrease in some of the desirable properties of the foamed material such as resiliency.

As to suitable polyethers in making elastomers, in order to make rubbery urethanes, i.e., those which are rubbery at normal temperatures, the molecular weight of the polyether glycol should be above 500 and preferably about 1500 to 2500. The maximum molecular weight of the polyether is dependent only upon the ability to economically make the polyethers of higher molecular weights with difunctionality, the higher molecular weights being preferred. Generally, it is exceedingly difficult to obtain polyethers with a molecular weight much above 3000 or 4000 without substantially higher costs and loss of some functionality.

The molar ratio of polyisocyanate to polyol is preferably about 8 to 1 to about 4 to 1 for suitable polyurethane foams, coatings and elastomers although benefits of this invention may be obtained with as low a molar ratio as 0.5 to 1 or as high as 10 or 12 to 1.

Generally for coatings, a range of about 1 to 3 mols per mol of polyol is used although polyether glycols may be used in the range of about 0.5 to 0.8 up to about 10 to 12 mols of diisocyanate per mol of polyether glycol.

As to using polyols for polyurethane coatings, the polyisocyanate and the polyol may be mixed in a solvent and spread upon the surface by similar means such as dipping, roller coating, knife coating, brushing or spraying. Upon heating the polymerization of the reaction products and evaporation of the solvent is accomplished.

For some purposes it may be desirable to substitute up to about 50% by weight of the polyethers by polyesters having a molecular weight of at least 500 such as poly (propylene-ethylene) adipate and polyethylene adipate and poly (ethylene-butylene-1,4) adipate. However, aging resistance suffers when the polyether glycols are less than 90% by weight of the total polyols present.

The polyisocyanate compounds used for preparing the cellular rubber, solid rubber and films of the present invention are preferably organic compounds having two active isocyanate groups. Suitable diisocyanates are various aromatic and aliphatic diisocyanates such as naphthalene-1,5-diisocyanate, tolylene diisocyanate, p,p'-diisocyanato diphenyl methane, durene diisocyanate (2,3,5,6-tetramethyl para phenylene diisocyanate) and hexamethylene diisocyanate or mixtures of these.

Some triisocyanates may be used in conjunction with a diisocyanate, such as described above, when more rigidity is desired or when the polyether has insufficient trifunctionality to give the desired degree of branching.

The following examples illustrate the present invention:

EXAMPLE I

Foam samples were made in the laboratory using a simple high speed mixer for agitation. The formula used in this evaluation is as follows:

| | Parts by weight |
|---|---|
| 1. Polypropylene ether-triol | 100.0 |
| 2. Silicone oil [1] | 1.0 |
| 3. Dibutyl tin dilaurate | 0.2 |
| 4. N-methyl morpholine | 0.2 |
| 5. Triethylene diamine | 0.1 |
| 6. Water | 2.9 |
| 7. Antioxidant | 0.5–1.0 |
| 8. Tolylene diisocyanates | 38.0 |

[1] This silicone oil is a water dispersable product and thought to be a polyoxyalkylene polydimethyl siloxane block copolymer where the alkylene is ethylene and higher.

The ingredients of Items 2, 3, 4, 5, 6 and 7 were added to the polypropylene ether-triol having a molecular weight of about 2000 to 3000 and thoroughly mixed. A commercial grade of tolylene diisocyanate (80/20 isomeric mixture) was added to the mixture with vigorous agitation. The mixture was poured into ten-pound size rectangular paper bags. The bags were placed in a 250° F. oven for one-half hour after the foam had attained its maximum height.

Test specimens one inch in thickness were cut from the oven-cured foam "buns." To eliminate possible variations in density which occur from the top to bottom of a "bun," samples being compared were selected from equivalent areas of the buns.

The test data on these samples are shown in Tables I and II. To determine the percent oxygen absorption, a weighed sample of the foam was placed in an oxygen absorption apparatus at 120° C. and the rate of oxygen absorption was measured at various time intervals. FIGURES 1 and 2 are graphs of the percent by weight oxygen absorbed with time for each of these foam samples.

In Tables I and II antioxidant A is a mixture containing 15–20% of Compounds No. 4 and 5, 40–50% of Compounds No. 1 and 2, and 30–40% of Compound No. 3. Also, DBPC is ditertiary butyl-para-cresol.

TABLE I.—AGING RESULTS OF URETHANE FOAM SAMPLES CONTAINING VARIOUS ANTIOXIDANTS

| Antioxidant | Parts | Odor of foam | Color rating after oven aging 96 hrs. at 250° F. | Percent compression change on oven aging 96 hrs. at 250° F. | Percent compression change on humidity aging 7 days at 190° F. | Compression set 90% (percent retent of gage after week) |
|---|---|---|---|---|---|---|
| Control | None | None | 6 | +10.6 | −13.3 | 95.0 |
| Tri (octylphenyl) phosphite | 0.5 | do | 5 | +15.7 | −10.6 | 94.5 |
| Antioxidant A | 0.5 | do | 3½ | +16.8 | −10.5 | 95.0 |
| DBPC | 0.5 | do | 4 | +7.6 | −13.0 | 95.0 |
| Tri (octylphenyl) phenol | 1.0 | do | 5 | +8.4 | −10.0 | 95.0 |
| Antioxidant A | 1.0 | do | 3 | +8.4 | −9.0 | 94.0 |
| DBPC | 1.0 | do | 4½ | +8.3 | −14.1 | 95.0 |

TABLE II

[Percent retention of gauge (90% compression set test)]

| Antioxidant | Parts | 4½ hours after cure (percent retention of gauge) |
|---|---|---|
| Control | None | 88.8 |
| Tri (octylphenyl) phosphite | 1.0 | 88.6 |
| Antioxidant A | 1.0 | 93.9 |
| DBPC | 1.0 | 90.1 |

EXAMPLE II

The recipe of Example I was used with a continuous foam mixing machine to produce slab stock in a one shot operation. Antioxidant A gave the same superior resistance to oxygen absorption in this one shot experiment as in the batch experiment of Example I.

While certain representative embodiments and details have been shown for the purpose of illustrating the invention, it will be apparent to those skilled in this art that various changes and modifications may be made therein without departing from the spirit or scope of the invention.

We claim:

1. A method of preparing a heat and weather resistant polyurethane elastomer comprising the steps of mixing and reacting (1) about 0.5 mol to 12 mols of an organic diisocyanate, (2) about one mol of a polyalkylene ether polyol having a molecular weight of at least 500, and (3) about 0.3 to 5% by weight based on the weight of said polyol of an antioxidant being a mixture obtained by reacting phenol with styrene where the concentration of styrene is about 1 to 2 mols for each mol of phenol.

References Cited

UNITED STATES PATENTS

| 2,915,496 | 12/1959 | Swart et al. | 260—45.95 |
| 2,945,001 | 7/1960 | Spacht | 260—45.95 |
| 2,984,645 | 5/1961 | Hoeschele | 260—45.95 |

JAMES A. SEIDLECK, Primary Examiner.

H. E. TAYLOR, Assistant Examiner.